United States Patent
Guichard et al.

(10) Patent No.: US 8,101,279 B2
(45) Date of Patent: *Jan. 24, 2012

(54) SILOXANE-BASED COMPOSITION, WHICH DOES NOT EMIT HYDROGEN, INTENDED FOR MOLDING/MOLD-RELEASE OF PNEUMATIC TIRES

(75) Inventors: Gérald Guichard, Givors (FR); Ian Hawkins, Vaugneray (FR); Nadia Martin, Lyons (FR); Serge Montarnel, Bourg St.-Christophe (FR); Rose-Line Gaillard Montarnal, legal representative, Bourg St.-Christophe (FR); Laure Montarnal, legal representative, Bourg St.-Christophe (FR)

(73) Assignee: Bluestar Silicones France SAS, Lyons Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/178,861

(22) Filed: Jul. 24, 2008

(65) Prior Publication Data

US 2009/0053436 A1 Feb. 26, 2009

Related U.S. Application Data

(63) Continuation of application No. 10/510,818, filed as application No. PCT/FR03/01151 on Apr. 11, 2003, now abandoned.

(30) Foreign Application Priority Data

Apr. 12, 2002 (FR) ..................... 02 04633
Nov. 25, 2002 (FR) ..................... 02 14757

(51) Int. Cl.
*B32B 1/08* (2006.01)
*C08G 77/04* (2006.01)
*C10M 155/02* (2006.01)

(52) U.S. Cl. .................... 428/447; 508/208; 528/18
(58) Field of Classification Search ............... 508/208; 528/18; 428/447

See application file for complete search history.

(56) References Cited

U.S. PATENT DOCUMENTS

| 4,359,340 | A | 11/1982 | Comper et al. |
| 5,073,608 | A | 12/1991 | Ona et al. |
| 5,152,950 | A | 10/1992 | Ona et al. |
| 5,431,832 | A | 7/1995 | Crowe et al. |
| 6,825,153 | B2 * | 11/2004 | Giraud et al. ............... 508/208 |
| 7,439,211 | B2 * | 10/2008 | Guichard et al. ............ 508/208 |
| 2003/0109386 | A1 | 6/2003 | Giraud et al. |
| 2003/0114321 | A1 | 6/2003 | Giraud et al. |
| 2004/0209785 | A1 | 10/2004 | Guichard et al. |

FOREIGN PATENT DOCUMENTS

| EP | 0399526 A2 | 11/1990 |
| EP | 0635559 A2 | 1/1995 |
| FR | 2494294 A | 5/1982 |
| WO | WO 01/40417 A1 | 6/2001 |
| WO | WO 01/44416 A1 | 6/2001 |
| WO | WO 02/094971 A1 | 11/2002 |

OTHER PUBLICATIONS

Bruce B. Hardman, Arnold Torkelson; Silicon Compounds (SILICONES); 1982; General Electric Company; vol. 20; pp. 933-935.*
International Search Report in English for PCTFR03/01151 dated Sep. 5, 2003, of which U.S. Appl. No. 10/510,818 in the US national stage.

* cited by examiner

*Primary Examiner* — Robert Loewe
(74) *Attorney, Agent, or Firm* — Buchanan Ingersoll & Rooney, P.C.

(57) ABSTRACT

The present invention relates to a composition I, in the form of an oil-in-water emulsion, based on siloxane and which does not emit hydrogen, comprising:
 (a) optionally a nonreactive linear polyorganosiloxane oil with lubricating properties,
 (a') a reactive linear polyorganosiloxane oil containing at least two OH groups per molecule,
 (b) a polyorganosiloxane resin,
 (c) a crosslinking agent which is soluble in the silicone phase comprising at least two functional groups capable of reacting with the polyorganosiloxane resin (b);
 (d) a condensation catalyst capable of catalyzing the reaction of the constituent (b) with the constituent (c);
 (e) a surfactant; and
 (f) water,
(a) and (a') being mixed together before emulsification, in an (a)/(a') ratio of between 0 and 10.

55 Claims, No Drawings

SILOXANE-BASED COMPOSITION, WHICH DOES NOT EMIT HYDROGEN, INTENDED FOR MOLDING/MOLD-RELEASE OF PNEUMATIC TIRES

CROSS-REFERENCE TO RELATED APPLICATIONS

This application is a continuation of copending U.S. patent application Ser. No. 10/510,818 filed Sep. 19, 2005, which is the U.S. national stage of International Appln. No. PCT/FR03/01151, filed Apr. 11, 2003, and claims priority under 35 U.S.C. §119(a)-(d) of French Patent Application No. 02/04633, filed Apr. 12, 2002, and French Patent Application No. 02/14757, filed Nov. 25, 2002, all of said applications being incorporated by reference herein in their entireties and relied upon.

The present invention relates to compositions in the form of a silicone oil emulsion, which are intended to be applied to curing bladders and/or to pneumatic or semipneumatic tires in order to facilitate molding/mold-release during the manufacture of pneumatic tires.

The invention relates in particular to an application as a lubricating composition which is particularly appropriate for lubricating the curing bladders used during the forming and curing of pneumatic or semi-pneumatic tires.

The invention also relates to an application as bonding primer.

The invention also relates to the curing bladders coated with a lubricating composition and/or with a bonding primer according to the invention and the pneumatic or semipneumatic tires coated with the said lubricating composition.

According to two more of its features, the invention relates to a process for preparing the lubricating compositions of the invention and to the use of the said lubricating compositions for lubricating curing bladders.

Pneumatic rubber tires for vehicles are usually manufactured by molding and by curing a raw, or uncured and unformed, tread in a molding press in which the raw tread is pressed outwards against the surface of a mold by means of a bladder which can be inflated by an internal fluid. By this process, the raw tread is formed against the outer surface of the mold which defines the pattern of the tire tread and the configuration of the side walls. The tread is cured by heating. In general, the bladder is inflated by the internal pressure provided by a fluid such as a hot gas, hot water and/or steam, which also participates in heat transfer for the curing. The tread is then allowed to cool slightly in the mold, this cooling being sometimes enhanced by the introduction of cold or cooler water into the bladder. The mold is then opened, the bladder is deflated by releasing the pressure of the internal fluid and the tread is removed from the tread mold. This use of the bladders for curing the tread is well known in the art.

It is accepted that a notable relative movement occurs between the outer surface of contact of the bladder and the inner surface of the tread during the bladder inflating phase before complete curing of the tread. Likewise, a considerable relative movement also occurs between the outer surface of contact of the bladder and the cured inner surface of the tread, after the tread has been molded and cured, during deflation and removal of the bladder from the pneumatic tire.

If adequate lubrication is not provided between the bladder and the inner surface of the tread, the bladder generally tends to get warped, which causes deformation of the tread in the mold and also excessive wearing and depolishing of the surface of the bladder itself. The surface of the bladder also tends to stick to the inner surface of the tread after curing of the tread and during the part of the tread curing cycle during which the bladder is deflated. In addition, air bubbles can be trapped between the surfaces of the bladder and of the tread and promote the appearance of curing defects in the treads resulting from inadequate heat transfer.

For this reason, the outer surface of the bladder and the inner surface of the raw or uncured tread is coated with an appropriate lubricant, sometimes designated by the name "casing cement".

Numerous lubricating compositions have been proposed to this effect in the art.

Lubricating compositions described in FR 2 494 294 are known in particular which contain, as main constituents, a reactive polydimethylsiloxane preferably having hydroxyl end groups, a crosslinking agent preferably comprising Si—H functional groups and optionally a polycondensation catalyst.

Examples of crosslinking agent with Si—H functional group(s) are methylhydrogensilane, dimethylhydrogensilane and polymethylhydrogensilane. The disadvantage of the lubricating compositions of this type is their instability during storage. Creaming of the emulsion is indeed observed following emission of hydrogen during the transport and preservation of the lubricating composition. The emission of hydrogen, which is responsible for the instability of the prior art compositions, results mainly from the decomposition of the constituents with Si—H functional group(s).

The preparation of lubricating compositions from constituents not comprising the Si—H functional group, and incidentally having excellent properties of durability, lubrication and elasticity is therefore highly desirable.

The compositions which are the subject of EP-A-635 559 are siloxane-based lubricating compositions which partly satisfy these requirements. These compositions are in particular more stable in that they do not emit hydrogen during storage.

These compositions, which are provided in the form of emulsions, comprise, as main constituents, a nonreactive polydimethylsiloxane, a reactive polydimethylsiloxane, preferably with a hydroxyl or alkoxy end, and a crosslinking agent. Their durability is however insufficient for practical use in the production of pneumatic or semipneumatic tires.

WO-A-01 40417 describes a lubricating composition, in the form of an oil-in-water emulsion, based on siloxane and which does not emit hydrogen, comprising:

(a) a nonreactive polydiorganosiloxane oil with lubricating properties, having a dynamic viscosity of the order of $5 \times 10^{-2}$ to $30 \times 10^2$ Pa·s at 25° C.;

(b) a polyorganosiloxane resin carrying, before emulsification, condensable hydroxyl substituents and at least two different siloxyl units chosen from those of formula $(R^0)_3 SiO_{1/2}$(M); $(R^0)_2 SiO_{2/2}$(D); $R^0 SiO_{3/2}$(T) and $SiO_{4/2}$(Q), at least one of these units being a T or Q unit, in which formulae $R^0$ represents a monovalent organic substituent, the mean number per molecule of organic radicals $R^0$ for a silicon atom being between 1 and 2; and the said resin having a content by weight of hydroxyl substituents of between 0.1 and 10% by weight, and preferably between 0.2 and 5% by weight;

(c) a crosslinking agent, which is soluble in the silicone phase, comprising at least two functional groups capable of reacting with the polyorganosiloxane resin (b);

(d) a condensation catalyst capable of catalyzing the reaction of the constituent (b) with the constituent (c);

(e) a surfactant; and (f) water, the said composition comprising from 5 to 95 parts by weight of the constituent (a), from 0.5 to 50 parts by weight of the constituent (b) and from 0.1 to 20 parts by weight of the constituent (c), from 0.05 to 10 parts by weight of the constituent (d), per 100 parts by weight of the sum of the constituents (a)+(b)+(c)+(d).

In these compositions, the nonreactive oil (a) is a linear homopolymer or copolymer containing organic groups chosen from alkyl, alkenyl, aryl, cycloalkyl, cycloalkenyl, aralkyl and alkaryl. The preferred oils (a) are the linear polydimethylsiloxanes with repeating units $(CH_3)_2SiO_{2/2}$ and having $(CH_3)_3SiO_{1/2}$ units at their ends.

WO-A-01 40417 also predicts that it is possible to add, to this lubricating composition, a reactive linear polydiorganosiloxane oil having at least two OH groups per molecule and having a dynamic viscosity at 25° C. of between $5\times10^{-2}$ and $30\times10^2$ Pa·s. This reactive oil may then be present in a very broad range of values, namely in an amount of 0.5 to 30% by weight, preferably 1 to 10% by weight, relative to the total weight of the lubricating composition.

The linear polydimethylsiloxane-based lubricating compositions described in WO-A-01 40417 constitute an improvement in relation to EP-A-635 559. It is however desirable to further improve the sliding and durability properties of the lubricating compositions.

Customarily, inflatable bladders, before being coated, on their outer surface (the one which comes into contact with the tire) with a lubricating composition, can be subjected to a pretreatment consisting in applying an even layer of a so-called primer or alternatively bonding primer composition.

It is also useful to develop primers with good bonding properties and good compatibility with the lubricating compositions used.

The objective of the present invention is therefore to provide improved lubricating compositions which do not emit hydrogen and which have moreover excellent sliding and durability characteristics, which makes them perfectly appropriate for lubricating the bladders used during the curing of pneumatic and semipneumatic tires.

Its objective is also to provide compositions which serve as bonding primer.

In general, the subject of the invention is a composition in the form of a silicone oil-in-water emulsion, based on siloxane, which does not emit hydrogen and which is capable of being used in the molding/mold release of pneumatic tires. This composition comprises, more precisely, the following constituents (a), (a'), (b), (c), (d), (e), (f):

(a) optionally at least one nonreactive linear polyorganosiloxane oil with lubricating properties, having a dynamic viscosity of the order of $5\times10^{-2}$ to $30\times10^2$ Pa·s at 25° C. and consisting of a linear homopolymer or copolymer:

in which, per molecule, the monovalent organic substituents, which are identical or different from each other, linked to the silicon atoms are chosen from alkyl, cycloalkyl, alkenyl, aryl, alkylarylene and arylalkylene radicals, aryl, alkylarylene and/or arylalkylene radicals being preferably present, and, more preferably, in which, per molecule, at least 1 or 2%, in particular from 5 to 50%, better still from 8 to 35%, in numerical terms, of the said monovalent organic substituents linked to the silicon atoms are aryl, alkylarylene and arylalkylene radicals;

(a') at least one reactive linear polyorganosiloxane oil containing at least two OH groups per molecule and having a dynamic viscosity ranging from $5\times10^{-2}$ to 200 000, in particular from $5\times10^{-2}$ to 150 000, preferably from $5\times10^{-2}$ to $30\times10^2$ Pa·s at 25° C.;

(b) at least one polyorganosiloxane resin carrying condensable hydroxyl substituents and containing at least two different siloxyl units chosen from those of formula $(R^1)_3SiO_{1/2}$ (M); $(R^1)_2SiO_{2/2}$ (D); $R^1SiO_{3/2}$ (T) and $SiO_{4/2}$ (Q), at least one of these units being a T or Q unit, in which formulae $R^1$ represents a monovalent organic substituent, the average number per molecule of organic radicals $R^1$ for a silicon atom being between 1 and 2; and the said resin having a content by weight of hydroxyl substituents advantageously of between 0.1 and 10% by weight, and preferably between 0.2 and 5% by weight;

(c) at least one crosslinking agent which is soluble in the silicone phase comprising at least two functional groups capable of reacting with the polyorganosiloxane resin (b);

(d) at least one condensation catalyst capable of catalyzing the reaction of the constituent (b) with the constituent (c);

(e) at least one surfactant; and (f) water, the quantities of surfactant(s) and of water being sufficient for producing an oil-in-water emulsion, the constituent (a)/constituent (a') weight ratio being within the range from 0 to 10, in particular from 0 to 9, and the constituents (a) and (a') and more generally (a), (a'), (b) and (c) being mixed with each other before emulsification.

When the composition contains little or no nonreactive oil (a), it rather develops bonding primer properties after heating and crosslinking on its support. For higher relative quantities of constituent (a), the composition develops lubricating properties. Without wishing to be bound by theory, it is thought that after crosslinking of the composition on its support, the composition develops lubricating properties as a result of the presence, in sufficient quantity, of noncrosslinked oil (a). In general, it is estimated that an (a)/(a') ratio of between 0 and 1, in particular between 0 and 0.7 defines a bonding primer, whereas a ratio of between 1.5 and 10 rather defines a lubricating composition. The range between 1 and 1.5 corresponds to less clear-cut properties which persons skilled in the art can evaluate and exploit in the molding/mold release activity as primer or lubricant, depending on the cases.

According to a first embodiment, the composition, in particular lubricating composition, is such that the (a)/(a') weight ratio is within the range from 1.5 to 10, in particular from 1.5 to 9, preferably from 2 to 6, more preferably from 3 to 5, better still from 3.5 to 4.5.

The constituents (a), (a'), (b), (c), (d) and (e) of the emulsion are defined with reference to their initial chemical structure, that is to say that which characterizes them before emulsification. Once they are in an aqueous medium, their structure is likely to be greatly modified following hydrolysis and condensation reactions.

The expression dynamic viscosity is understood to mean, in the context of the invention, the Newtonian-type viscosity, that is to say the dynamic viscosity, measured in a manner known per se at a given temperature, at a shear rate gradient which is sufficiently low for the measured viscosity to be independent of the rate gradient.

Preferably, the lubricating composition according to the invention comprises:

from 55 to 98.85 parts by weight of the sum of the constituents (a)+(a');
from 1 to 30 parts by weight of the constituent (b),
from 0.1 to 10 parts by weight of the constituent (c),
from 0.05 to 5 parts by weight of the constituent (d),
per 100 parts by weight of the sum of the constituents (a)+(a')+(b)+(c)+(d).

Each of the nonreactive polydiorganosiloxane oils of the constituent (a) has a dynamic viscosity which is generally between $5\times10^{-2}$ and $30\times10^2$ Pa·s at 25° C. Preferably, the dynamic viscosity varies between $5\times10^{-2}$ and 30 Pa·s, better still between $5\times10^{-2}$ and 5 Pa·s.

In the context of the invention, the expression "nonreactive" is understood to mean an oil which, under the conditions for emulsification, preparation of the lubricating composition and use, does not react chemically with any of the constituents of the composition.

As preferred constituent (a), there may be mentioned linear polyorganosiloxanes:
consisting along each chain:
of the units of formula $R^2R^3SiO_{2/2}$, optionally combined with units of formula $(R^2)_2SiO_{2/2}$,
of the units of formula $(R^3)_2SiO_{2/2}$, optionally combined with units of formula $(R^2)_2SiO_{2/2}$,
of the units of formula $R^2R^3SiO_{2/2}$ and units of formula $(R^3)_2SiO_{2/2}$, optionally combined with units of formula $(R^2)_2SiO_{2/2}$,
and blocked at each chain end with a unit of formula $(R^4)_3SiO_{1/2}$ in which the radicals $R^4$, which are identical or different, are chosen from the radicals $R^2$ and $R^3$;
where the radicals $R^2$ and $R^3$, monovalent organic substituents of the various siloxyl units mentioned above, have the following definitions:
the radicals $R^2$, which are identical to or different from each other, are chosen from: linear or branched $C_1$-$C_6$ alkyl radicals (such as for example methyl, ethyl, propyl, isopropyl, butyl, isobutyl, t-butyl, n-pentyl, n-hexyl), $C_3$-$C_8$ cycloalkyl radicals (such as for example cyclopentyl, cyclohexyl), and linear or branched $C_2$-$C_8$ alkenyl radicals (such as for example vinyl, allyl),
the radicals $R^3$, which are identical to or different from each other, are chosen from: $C_6$-$C_{10}$ aryl radicals (such as for example phenyl, naphthyl), $C_6$-$C_{15}$ alkylarylene radicals (such as for example tolyl, xylyl), $C_6$-$C_{15}$ arylalkylene radicals (such as for example benzyl); and
where at least 1 or 2%, in particular from 5 to 50%, and better still from 8 to 35%, in numerical terms, of the substituents $R^2$, $R^3$ and $R^4$ are aromatic radicals $R^3$.

The presence in the polyorganosiloxane(s) forming the constituent (a), mixed with the conforming siloxyl units mentioned above, of units with a different structure, for example of formula $R^4SiO_{3/2}$ and/or $SiO_{4/2}$ is not excluded in the proportion of at most 2% (this % expressing the number of $R^4SiO_{3/2}$ and/or $SiO_{4/2}$ units per 100 silicon atoms).

More preferably, the constituent (a) consists of at least one linear polyorganosiloxane:
consisting along each chain:
of the units of formula $R^2R^3SiO_{2/2}$ combined with units of formula $(R^2)_2SiO_{2/2}$,
of the units of formula $(R^3)_2SiO_{2/2}$ combined with units of formula $(R^2)_2SiO_{2/2}$;
and blocked at each chain end by a unit of formula $(R^2)_3SiO_{1/2}$;
where the radicals $R^2$ and $R^3$ have the following definitions:
the radicals $R^2$, which are identical to or different from each other, are chosen from the methyl, ethyl, propyl and isopropyl radicals,
the radicals $R^3$, which are identical to or different from each other, are chosen from the phenyl, tolyl and benzyl radicals; and
where at least 1 or 2%, in particular from 5 to 50%, and better still from 8 to 35%, in numerical terms, of the substituents $R^2$ and $R^3$ are phenyl, tolyl and/or benzyl radicals.

Advantageously, there is used as constituent (a) at least one linear polyorganosiloxane having, per molecule, an aromatic substituents $R^3$/Si ratio (in numerical terms) at least equal to 0.04, preferably ranging from 0.09 to 1 and better still ranging from 0.16 to 0.7.

According to one modality of the invention, each of the reactive linear polydiorganosiloxane oils of the constituent (a') having at least two OH groups per molecule has a dynamic viscosity at 25° C. generally of between $5\times10^{-2}$ and $30\times10^2$ Pa·s. Preferably, the viscosity varies between $5\times10^{-2}$ and 30 Pa·s, better still between 0.1 and 5 Pa·s.

In the context of the invention, the term "reactive" denotes the reactivity of the constituent (a') in relation to the crosslinking agents (c) and/or (g) present in the emulsion; the optional constituent (g) will be defined later.

Preferably, the constituent (a') reacts with the crosslinking agent under the conditions for preparing the emulsion.

The monovalent organic substituents of the oil (a') are: linear or branched alkyl radicals; linear or branched alkenyl radicals; cycloalkyl or cycloalkenyl radicals; cycloalkylalkylene or cycloalkenylalkylene radicals; these radicals are optionally substituted with —OH and/or amino (optionally substituted) and/or halogen and/or cyano groups. The substituent of the amino group may be an alkyl radical, a cycloalkyl radical or a cycloalkylalkylene radical.

As halogen, there may be mentioned chlorine, fluorine, bromine or iodine, fluorine being more specifically appropriate.

Advantageously, the organic substituents of the oil (a') or of the oils (a') are: $C_1$-$C_6$ alkyl radicals; $C_3$-$C_8$ cycloalkyl radicals; $C_2$-$C_8$ alkenyl radicals; or $C_5$-$C_8$ cycloalkenyl radicals; the said radicals being optionally substituted with hydroxyl and/or amino (optionally substituted), and/or halo, and/or cyano.

The substituents of the amino group are for example: ($C_1$-$C_6$)alkyl; ($C_2$-$C_8$)alkenyl; ($C_3$-$C_8$)cycloalkyl.

As preferred constituent (a'), there may be mentioned the linear polyorganosiloxanes of formula:

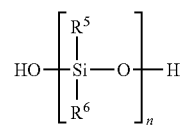

in which n is an integer greater than or equal to 10, $R^5$ and $R^6$, which are identical or different, represent: ($C_1$-$C_6$)alkyl; ($C_3$-$C_8$)cycloalkyl; ($C_2$-$C_8$)alkenyl; ($C_5$-$C_8$)cycloalkenyl; each of the abovementioned radicals being optionally substituted with a halogen atom (and preferably fluorine) or a cyano residue.

The oils of the constituent (a') which are most widely used, because of their availability in industrial products, are those for which $R^5$ and $R^6$ are chosen independently from methyl, ethyl, propyl, isopropyl, cyclohexyl, vinyl and 3,3,3-trifluoropropyl. Most preferably, at least about 80% in numerical terms of these radicals are methyl radicals.

In practice, preference will be given, as oil(s) (a'), to α,ω-dihydroxypolydimethylsiloxanes, and in particular to oils of this type which are prepared by the anionic polymerization process described in the above-mentioned American patents: U.S. Pat. No. 2,891,920 and especially U.S. Pat. No. 3,294,725 (cited as a reference).

The constituent (b) consists of at least one polyorganosiloxane residue, carrying before emulsification condensable hydroxyl groups.

In the constituent units of these resins, each substituent $R^1$ represents a monovalent organic group.

In general, $R^1$ is a $C_1$-$C_{20}$ hydrocarbon radical optionally carrying one or more substituents.

Examples of hydrocarbon radicals are: a linear or branched alkyl radical having from 1 to 6 carbon atoms; a linear or branched alkenyl radical having from 2 to 8 carbon atoms; a cycloalkyl radical having from 3 to 8 carbon atoms; or a cycloalkenyl radical having from 5 to 8 carbon atoms.

The substituents of the hydrocarbon radical may be groups —OR' or —O—CO—R' in which R' is a hydrocarbon radical as defined above for $R^1$, which is unsubstituted.

Other substituents of the hydrocarbon radical may be aminated, amidated, epoxidized or ureido functional groups.

By way of example of substituents of the hydrocarbon radical, there may be mentioned the aminated functional groups of formula:

—$R_a$—$NR^7R^8$ in which:
$R_a$ represents a valency bond or represents a linear or branched $C_1$-$C_{10}$ divalent alkylene radical;
and $R^7$ and $R^8$ independently represent: H; a $(C_1$-$C_6)$ alkyl radical; a $(C_3$-$C_8)$cycloalkyl radical; or a $(C_6$-$C_{10})$aryl radical;
—$R_b$—NH—$R_c$—$NR^7R^8$ in which $R_b$ and $R_c$, which are identical or different, are as defined for $R_a$ above; and $R^7$ and $R^8$ are as defined above;
the functional group of formula:

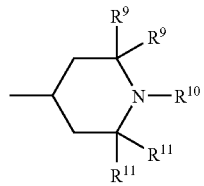

in which $R^9$ and $R^{11}$, which are identical or different, represent:
$(C_1$-$C_3)$alkyl, and for example methyl; or $(C_6$-$C_{10})$aryl, and for example phenyl;
$R^{10}$ represents: a hydrogen atom; $(C_1$-$C_6)$alkyl, for example methyl; $(C_2$-$C_7)$alkylcarbonyl; $(C_6$-$C_{10})$ aryl, and for example phenyl;
$(C_6$-$C_{10})$aryl$(C_1$-$C_6)$alkylene, and for example benzyl; or alternatively
$R^{10}$ represents O; and
the functional group of formula:

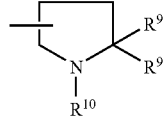

in which $R^9$ and $R^{10}$ are as defined above.

It is however preferable that the concentration of —OR', —O—CO—R', aminated, amidated, epoxidized or ureido functional groups, when they are present in the resin, are limited so as not to exceed the tolerance threshold above which the stability of the emulsion would be compromised.

The silicone resins (b) are branched organopolysiloxane polymers which are well known and whose processes of preparation are described in numerous patents. As concrete examples of resins which can be used, there may be mentioned the hydroxylated MQ, MDQ, DQ, DT and MDT resins and mixtures thereof. In these resins, each OH group is carried by a silicon atom belonging to a unit M, D or T.

Preferably, as examples of resins which can be used, there may be mentioned the hydroxylated organopolysiloxane resins not comprising, in their structure, the unit Q. More preferably, there may be mentioned the hydroxylated DT and MDT resins comprising at least 20% by weight of T units and having a content by weight of hydroxyl group ranging from 0.1 to 10%, and better still from 0.2 to 5%. In this group of more preferred resins, those in which the average number of substituents $R^1$ per silicon atom is, per molecule, between 1.2 and 1.8, are more particularly suitable. More advantageously still, resins of this type are used in whose structure at least 80% in numerical terms of the substituents $R^1$ are methyl radicals.

The resin (b) is liquid at room temperature. Preferably, the resin has a dynamic viscosity at 25° C. of between 0.2 and 200 Pa·s, in particular between 0.5 and 50 Pa·s, and better still between 0.8 and 5 Pa·s.

The resin is incorporated into the emulsions in an amount of 1 to 30 parts by weight per hundred parts by weight of the sum of the constituents (a), (a'), (b), (c) and (d), preferably in an amount of 3 to 20, better still from 5 to 15 parts by weight.

The constituent (c) consisting of at least one crosslinking agent which is soluble in the silicone phase comprises at least two functional groups capable of reacting with the resin(s) (b) so as to cause crosslinking of the resin(s). Advantageously, the said reactive functional groups of the crosslinking agent react with the resin under the conditions for preparing the emulsion.

By way of preferred constituent (c), there may be mentioned the crosslinking agents of formula:

$$Y_a Si(Zi)_{4-a}$$

in which:
a is 0, 1 or 2;
Y is a monovalent organic group; and
the groups Zi, which are identical or different, are chosen from: —$OX_a$,

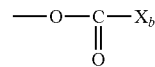

and —O—N=$CX_1X_2$, in which $X_a$, $X_b$, $X_1$ and $X_2$ are independently linear or branched $C_1$-$C_{10}$ alkyl radicals; it being understood that $X_1$ and $X_2$ may additionally represent hydrogen and that $X_a$ is a radical which is optionally substituted with $(C_1$-$C_3)$alkoxy.

According to a more preferred embodiment of the invention, a represents 0 or 1, such that the crosslinking agent has the formula: $Si(Zi)_4$ or $YSi(Zi)_3$.

Preferably still, the groups Zi are identical to each other.

A more preferred group of crosslinking agents consists in particular of all the organotrialkoxysilanes, organotriacyloxysilanes, organotrioxymosilanes and tetraalkyl silicates.

As regards the groups Y, there may be chosen more particularly the radicals: $(C_1$-$C_6)$alkyl; $(C_2$-$C_8)$alkenyl; $(C_3$-$C_8)$ cycloalkyl; $(C_6$-$C_{10})$aryl; $(C_6$-$C_{15})$alkylarylene; or $(C_6$-$C_{15})$ arylalkylene.

By way of example of groups Y, there may be mentioned the methyl, ethyl, vinyl or phenyl radicals.

The groups Zi are advantageously chosen from $(C_1$-$C_{10})$ alkoxy; $(C_1$-$C_{10})$alkoxy$(C_1$-$C_3)$alkoxy; $(C_1$-$C_{10})$alkylcarbonyloxy; or an oxime group —O—N=CX₁X₂ in which X₁ and X₂ are independently H or (C₁-C₁₀)alkyl.

Preferably, Zi represents methoxy, ethoxy, propoxy, methoxyethoxy, acetoxy or an oxime group.

By way of especially preferred constituent (c), there may be mentioned the alkyltrialkoxysilane(s) of formula YSi(Zi)₃ in which Y is (C₁-C₆)alkyl or (C₂-C₈)alkenyl and Zi is (C₁-C₁₀) alkoxy.

Among them, there may be mentioned methyltrimethoxysilane, methyltriethoxysilane, ethyltriethoxysilane and or vinyltrimethoxysilane.

The final emulsion comprises from 0.1 to 10 parts by weight, per hundred parts by weight of the sum of the constituents (a)+(a')+(b)+(c)+(d), of the constituent (c), preferably from 0.2 to 5 parts by weight, better still from 0.5 to 3.

The condensation catalyst (d) is chosen from those conventionally used in the art to catalyze the crosslinking of type (b) resins with the aid of the type (c) crosslinking agents defined above.

Examples of catalysts which can be used in the context of the invention are organometallic salts, titanates such as tetrabutyl orthotitanate. As organometallic salt, there may be mentioned zirconium naphthenate and zirconium octylate.

The catalyst is preferably a catalytic tin compound, generally an organotin salt. The organotin salts which can be used are described in particular in the book by NOLL, Chemistry and Technology of Silicones Academic Press (1968), page 337. There may also be defined as catalytic tin compounds either distannoxanes, or polyorganostannoxanes, or the product of the reaction of a tin salt, in particular of a tin dicarboxylate, with ethyl polysilicate, as described in patent U.S. Pat. No. 3,862,919.

The product of the reaction of an alkyl silicate or of an alkyltrialkoxysilane with dibutyltin diacetate as described in the Belgian patent BE-A-842 305, may also be suitable.

According to another possibility, use is made of a tin II salt, such as SnCl₂ or stannous octoate.

Advantageously, the catalyst is the tin salt of an organic acid, such as dibutyltin diacetate, dibutyltin dilaurate, dioctyltin dilaurate, dibutyltin dioctate, zinc naphthenate, cobalt naphthenate, zinc octylate, cobalt octylate and dioctyltin di(isomercaptoacetate).

The preferred tin salts are tin bischelates (EP-A-147 323 and EP-A-235 049), diorganotin dicarboxylates, and in particular dibutyl- or dioctyltin diversatates (British patent GB-A-1 289 900, dibutyl- or dioctyltin diacetate, dibutyl- or dioctyltin dilaurate or the products of hydrolysis of the above-mentioned species (for example diorgano- and polystannoxanes).

The catalyst (d) is generally introduced into the emulsion in an amount of 0.05 to 5 parts by weight, per hundred parts by weight of the sum of the constituents (a)+(a')+(b)+(c)+(d), preferably in an amount of 0.08 to 3 parts by weight, and better still from 0.1 to 2 parts by weight.

Doctyltin dilaurate is most particularly preferred.

The nature of the surfactant (e) will be easily determined by persons skilled in the art, the objective being to prepare a stable emulsion.

Anionic, cationic, nonionic and zwitterionic surfactants may be used alone or as a mixture.

As anionic surfactants, there may be mentioned the alkali metal salts of aromatic hydrocarbon sulfonic acids or the alkali metal salts of alkylsulfuric acids.

Nonionic surfactants are more particularly preferred in the context of the invention. Among these, there may be mentioned alkyl or aryl ethers of poly(alkylene oxide), polyoxyethylenated sorbitan hexastearate, polyoxyethylenated sorbitan oleate having a saponification value of 102 to 108 and a hydroxyl value of 25 to 35 and the ethers of cetylstearyl and poly(ethylene oxide).

As aryl ether of poly(alkylene oxide), there may be mentioned polyoxyethylenated alkylphenols. As alkyl ether of poly(alkylene oxide), there may be mentioned isodecyl ether of polyethylene glycol and trimethylnonyl ether of polyethylene glycol containing from 3 to 15 ethylene oxide units per molecule.

There may also be mentioned ethoxylated isotridecyl alcohol, e.g. with from 8 to 9 mol of ethylene oxide per mol of isotridecyl alcohol.

The quantity of surfactant (e) depends on the type of each of the constituents present and the actual nature of the surfactant used. As a general rule, the emulsion comprises from 0.5 to 10% by weight of surfactant (better still from 0.5 to 5% by weight) and from 40 to 95% by weight of water (better still from 45 to 90% by weight).

Advantageously, the final emulsion may additionally comprise a constituent (g) consisting of at least one water-soluble crosslinking agent, in particular a silane, the said crosslinking agent carrying, per molecule, in addition to at least one OH group, at least one organic group with a functional group Fr, Fr representing an optionally substituted amino functional group, an epoxy functional group, an optionally substituted acryloyl (—CH₂═CH—CO—) functional group, an optionally substituted methacryloyl (—CH₂═C(CH₃)—CO—) functional group, an optionally substituted ureido (NH₂—CO—NH—) functional group, an optionally substituted thiol functional group or a halogen atom.

For the purposes of the present invention, water-solubility should be understood to mean the ability of a product to dissolve in water at a temperature of 25° C., in amount of at least 5% by weight.

The possible organic substituents of the crosslinking agents other than the OH group(s) or the organic group(s) with a functional group Fr, are: linear or branched alkyl radicals having from 1 to 6 carbon atoms; cycloalkyl radicals having from 3 to 8 carbon atoms; linear or branched alkenyl radicals having from 2 to 8 carbon atoms; aryl radicals having from 6 to 10 carbon atoms; alkylarylene radicals having from 6 to 15 carbon atoms; or arylalkylene radicals having from 6 to 15 carbon atoms.

According to a preferred embodiment of the invention, Fr is an optionally substituted amino functional group.

Thus, a preferred organic group with a functional group Fr is a group chosen from the formulae:

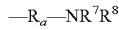

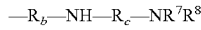

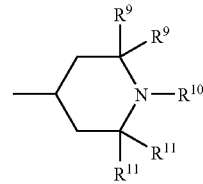 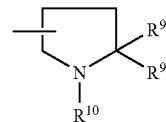

where $R_a$, $R_b$, $R_c$, $R^7$, $R^8$, $R^9$, $R^{10}$ and $R^{11}$ are as defined above in relation to the definition of the constituent (b).

According to a more preferred embodiment of the invention, the water-soluble crosslinking agent has the formula:

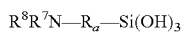

in which $R_a$, $R^7$ and $R^8$ are as defined above. Still more preferably, $R_a$ represents $(C_1-C_{10})$alkylene, and $R^7$ and $R^8$ independently represent a hydrogen atom or a $(C_1-C_6)$alkyl group.

By way of example, there may be mentioned 3-aminopropyltrihydroxysilane.

This constituent (g), when it is present in the emulsion, is used in an amount of 0.5 to 15 parts by weight per hundred parts by weight of the sum of the constituents (a)+(a')+(b)+(c)+(d)+(g), preferably in an amount of 0.6 to 5 parts by weight, and better still in an amount of 0.8 to 3 parts by weight.

The presence of the constituent (g) enhances in particular the durability of the lubricating composition.

The emulsion may also contain one or more additional ingredients such as for example film-forming polymers, additional lubricants, anti-friction agents, coalescing agents, wetting or dispersing agents, inorganic fillers, agents for evacuating air, antifoaming agents, thickeners, stabilizers, preservatives such as biocides and antifungals, in quantities which can vary considerably, for example between 0.2 and 50% by weight of the emulsion.

As film-forming polymer, there may be mentioned for example stirene-acrylic copolymers.

Examples of thickeners are cellulosic thickeners (carboxymethylcellulose), acrylic thickeners, polyurethane, hydrocolloid gums (xanthan gum) and mixtures thereof.

As coalescing agent, there may be used glycols and/or aliphatic petroleum cuts (distillation fractions of petroleum).

Wetting or dispersible agents which can be used in the context of the invention are for example phosphates and/or polyacrylics, such as for example sodium hexametaphosphate and sodium polyacrylates.

The compositions of the invention may be conventionally prepared using conventional methods of the state of the art, from a preliminary mixture comprising the lipophilic constituents (a), (a'), (b) and (c). The objective is to arrive at an emulsion in which the nonreactive oil, the reactive oil and the constituents intended to form the elastomeric network are present in the same oily particles.

The emulsification may be direct or may proceed by inversion.

For direct emulsification, the process consists in emulsifying in an aqueous phase containing the surfactant (e), a mixture of the constituents (a), (a'), (b) and (c). An oil-in-water emulsion is directly obtained. Next, the missing constituents may be added, either directly to the emulsion (case of the water-soluble constituents), or subsequently in the form of an emulsion (case of the constituents soluble in the silicone phase). As a variant, the latter may also be added to the initial (a), (a'), (b), (c) mixture.

Thus, the catalyst (d) and the optional film-forming polymer may be added, either directly to the silicone phase before emulsification, or after forming the emulsion, in the form of an additional emulsion.

The particle size of the emulsion obtained above may be adjusted by conventional methods known to a person skilled in the art, in particular by carrying out the stirring in a reactor for a suitable duration. The target is in particular a particle size of between 0.1 and 0.5 µm, preferably between 0.2 and 0.4 µm.

In the case where the procedure is carried out by inversion, the preferred embodiment envisages preparing, with stirring, a premixture containing only a small proportion of water (containing the surfactant (e) and optionally the water-soluble constituents) and the constituents (a), (a'), (b), (c), carrying out its inversion (for example by grinding), that is to say converting the premixture to an oil-in-water emulsion, and then diluting this emulsion with the remaining water, optionally supplemented with one or more water-soluble constituents. The grinding advantageously makes it possible to directly obtain the desired particle size, which is preferably as seen above in relation to the direct emulsification.

Normally, the processes of the invention are carried out at room temperature. Preferably, the rise in temperature which may result from the grinding and stirring steps is kept low. In particular, it is chosen to remain below 60 or 65° C. This is in particular the case when, in accordance with the preferred embodiment of the invention, anionic surfactants are used.

The process of the invention may additionally comprise an additional step of heating the lubricating composition obtained, for example to a temperature ranging from 30 to 40° C. This step makes it possible to accelerate the crosslinking processes. It can be replaced by a step of storing the lubricating composition at room temperature (23° C.) until complete crosslinking is obtained.

The oils and resins (a), (a') and (b) and the crosslinking agents (c) and (g) are commercially available or easily accessible to a person skilled in the art using conventional processes described in the prior art.

When the resin (b) or the crosslinking agent (c) are functionalized, the functionalization is easily carried out by an appropriate substitution or addition reaction.

The subject of the invention is also the use of the lubricating composition thus obtained for lubricating various articles.

More particularly, the invention relates to the use of the lubricating composition for lubricating a curing bladder, preferably made of rubber or the like and inflatable, during the forming and curing of pneumatic or semipneumatic tires.

The lubricating composition of the invention may be applied in any manner, for example by spraying, brushing or with the aid of a sponge or a brush. It is preferable to proceed so as to cover the article to be coated with an even layer of coating.

The lubrication of the curing bladder used during the forming and curing of pneumatic or semipneumatic tires may be carried out in two different ways.

During the manufacture of pneumatic or semipneumatic tires, a raw tire is placed in a tire mold, an inflatable bladder is placed in the mold, the mold is closed and the bladder is inflated by applying an internal pressure of a hot fluid, such that the tire is applied against the mold, formed and cured. The mold is then opened, the bladder is deflated and the tire is recovered, formed and cured. The same bladder is used for the manufacture of about one hundred tires.

The inflatable rubber bladder used during the manufacture of tires is initially coated with a lubricating composition according to the invention.

Initially, the lubrication of the bladder is direct. Then, a phenomenon of exhaustion of the lubricating effect of this bladder occurs.

In this subsequent phase, it is the inner surface of the tire (that which comes into contact with the bladder) which is coated with the lubricating composition. There is regeneration of the lubrication of the rubber bladder by transfer from the tire.

In general, the mold pressing/bladder release cycles used during the manufacture of tires occur in the following way:
- the bladder initially coated with the lubricating composition (direct lubrication) is heated to 80-180° C., preferably to 130-170° C., is used (without subsequent coating of the bladder, but by coating the first tire or the first two tires) during 5 to 10 cycles (each cycle resulting in the manufacture of a different tire), and then
- the next cycles are carried out using this same bladder (for which the lubricating coating has been exhausted) starting with pneumatic or semipneumatic tires which are then each time coated with the lubricating composition according to the invention: the lubrication of the bladder occurs in this case by transfer.

The present invention therefore also relates to the use of the lubricating composition for lubricating raw pneumatic or semipneumatic tires, containing or otherwise on their outer surface components which will constitute the outer tire tread intended to come into contact with the ground.

The lubricating composition of the invention comprises no constituent with an Si—H bond such that the risk of emission of hydrogen during storage or transport is zero.

The lubricating composition of the invention additionally has excellent sliding, durability and elasticity properties.

The present invention also relates to articles lubricated with the lubricating composition which may be obtained using the process which has just been described above.

More particularly, the invention relates to:
an inflatable rubber bladder coated on its outer surface with a composition according to the invention, for the forming and curing of pneumatic or semipneumatic tires;
an inflatable rubber bladder which may be obtained by heating the inflatable bladder defined above, in particular to 80-180° C. (preferably 130-170° C.), so as to bring about complete crosslinking of the crosslinkable constituents of the emulsion;
a raw pneumatic or semipneumatic tire containing or not containing components which will constitute its outer tread intended to come into contact with the ground, coated on its inner surface with a lubricating composition according to the invention.

According to a second embodiment of the invention, the oil-in-water emulsions according to the invention are this time such that the constituent (a)/constituent (a') weight ratio is in the range from 0 to 1, in particular from 0 to 0.7. According to a first modality, the oil-in-water emulsion which serves as primer only contains, as oil, an oil (a') with an OH group, an oil (a) not being present. According to another embodiment of primer, the two types of oil are present, and it is then preferable that the constituent (a)/constituent (a') weight ratio is different from 0, e.g. between 0.1 and 1, in particular between 0.1 and 0.7, preferably between 0.1 and 0.5 and more preferably between 0.2 and 0.3.

This oil-in-water emulsion which serves as primer contains the other ingredients (b), (c), (d), (e) and (f) described in relation to the lubricating composition. Overall, the quantities of these other ingredients are identical to those described for the lubricating composition. In particular, the composition may comprise:
from 55 to 98.85 parts by weight of the sum of the constituents (a)+(a');
from 1 to 30 parts by weight of the constituent (b),
from 0.1 to 10 parts by weight of the constituent (c),
from 0.05 to 5 parts by weight of the constituent (d),
per 100 parts by weight of the sum of the constituents (a)+(a')+(b)+(c)+(d). For further details on the constituents which may enter into the composition of the oil-in-water emulsion which serves as primer, reference is made to the above description of these constituents, which was made for the lubricating composition. Likewise, the additional constituents which were provided for the lubricating composition may also be incorporated under the same conditions into the bonding primer.

The primer may additionally comprise one or more reinforcing fillers, in particular silica, e.g. precipitated, fumed or natural silica, calcium carbonate, mica or alternatively an organic polymer of the fluorinated polymer type.

Likewise, the process for preparing the oil-in-water emulsion is identical to the process of preparation described for the preparation of the lubricating composition.

This primer is in particular intended to be applied to an inflatable bladder, before using the lubricating composition according to the invention or a standard lubricating composition. The application of this primer may be carried out by conventional methods such as spraying, brushing, application with a sponge or with a brush.

This bonding primer has proved to be particularly useful in combination with lubricating compositions containing (SiH) groups as with those free of (SiH) groups, and more particularly with the lubricating compositions according to the present invention.

The subject of the present invention is therefore also the process consisting in applying the oil-in-water emulsion which has just been described to the surface of an inflatable bladder, as a bonding primer. After application, the crosslinking is carried out by heating, in particular to 80-180° C., preferably 130-170° C.

The subject of the invention is also an inflatable bladder or the like thus coated.

The following examples which illustrate the invention demonstrate the excellent lubricating properties of the compositions of the invention.

EXAMPLE 1

This example illustrates a lubricating composition according to the invention comprising a water-soluble crosslinking agent (constituent (g)).

The constituent (a')/constituent (a) weight ratio is chosen equal to 4.

The formulation of this composition, which is an oil-in-water emulsion, is given in the following table.

TABLE 1

| Nature of the constituent | Identification | Percentage by weight in the emulsion |
|---|---|---|
| Phenylated siloxane oil $M\text{-}(D^{Ph/Me})_{20}\text{-}(D)_{80}\text{-}M$ with a dynamic viscosity equal to $10^{-1}$ Pa · s to 25° C.[1] | Constituent (a) | 31.94 |
| Hydroxylated linear polydimethylsiloxane with $(CH_3)_2(OH)SiO_{1/2}$ endings with a dynamic viscosity equal to 0.75 Pa · s to 25° C. | Constituent (a') with (a)/(a') weight ratio = 4 | 7.98 |
| MDT-OH resin [2] | Constituent (b) | 5.71 |
| Methyltriethoxysilane | Constituent (c) | 0.38 |
| Dioctyltin dilaurate emulsion [3] | Constituent (d) | 0.24 |
| Polyethoxylated isotridecyl alcohol[4] | Constituent (e) | 2.71 |
| $NH_2\text{—}(CH_2)_3\text{—}Si(OH)_3$ [5] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agents | | 0.30 |
| Distilled water | Constituent (f) | 47.94 |
| | | 100 |

[1] Phenylated siloxane oil:
$M = (CH_3)_3SiO_{1/2}$ unit
$D = (CH_3)_2SiO_{2/2}$ unit
$D^{Ph/Me} = (C_6H_5)(CH_3)SiO_{2/2}$ unit
$Ph = C_6H_5$
[2] MDT resin having a hydroxylation level of 0.5% by weight, an average number per molecule of organic radicals per silicon atom of 1.5, a dynamic viscosity at 25° C. of 1 Pa · s and the following proportions of siloxyl units:
M: 17% by mol
D: 26% by mol
T: 57% by mol.
[3] Dicotyltin dilaurate emulsion at 37.5% by weight in water prepared using polyvinyl alcohol as surfactant.
[4] Mixture of 15% of water and 85% of isotridecyl alcohol ethoxylated with 8 to 9 mol of ethylene oxide per mol of isotridecyl alcohol.
[5] Aqueous solution containing 23% by weight of silane.

The lubricating composition of Table 1 was prepared in two steps.

Step 1

A mixture composed of nonreactive phenylated oil, hydroxylated polydimethylsiloxane oil, MDT-OH resin, methyltriethoxysilane, surfactant and a portion of distilled water (in a water/surfactant ratio of 1.2, that is 2.35% by weight of water) is homogenized beforehand with moderate stirring (50 revolutions/minute) for 15 minutes at room temperature (23° C.).

The mixture thus obtained is treated by grinding until phase inversion is obtained, with the aid of a Moritz® mill so as to pass from a water/oil fluid phase to an oil/water thick phase.

The dilution of the thick phase obtained is carried out with moderate stirring over 40 minutes, with the aid of a defined quantity of distilled water so as to obtain an emulsion whose dry matter content is 50% (that is 45.59% by weight of water). The bactericidal agent and the antioxidant are added during the dilution.

Step 2

The silane (g) and the catalyst (d) are added to the emulsion prepared beforehand, and then homogenization is carried out with gentle stirring for 10 minutes, followed by filtration.

The biocide and the antifoam are then added to the emulsion, and the mixture is stirred for another 10 minutes. The emulsion thus obtained is characterized by an average particle size of 0.4 μm.

The xanthan gum and the wetting agent are loaded into another container, mixed for 10 minutes with vigorous stirring, and then added to the emulsion previously prepared. The mixture is further stirred, at moderate speed, for 30 minutes.

The final emulsion is characterized by a dry matter content (60 min, 120° C.) of 48.8% by weight.

EXAMPLE 2

This example illustrates a lubricating composition identical to that of Example 1 but prepared by choosing a constituent (a)/constituent (a') weight ratio equal to 2.3.

The emulsion obtained is characterized by a mean particle size of 0.401 μm and a dry matter content (60 min, 120° C.) of 48.6% by weight.

EXAMPLE 3

This example illustrates a lubricating composition identical to that of Example 1 but prepared by choosing a constituent (a)/constituent (a') weight ratio equal to 1.5.

The emulsion obtained is characterized by a mean particle size of 0.398 μm and a dry matter content (60 min, 120° C.) of 48.7% by weight.

EXAMPLE 4

This example illustrates a lubricating composition identical to that of Example 1 but prepared by choosing a constituent (a)/constituent (a') weight ratio equal to 9.

The emulsion obtained is characterized by a mean particle size of 0.405 μm and a dry matter content (60 min, 120° C.) of 48.8% by weight.

COMPARATIVE EXAMPLE 5

This example illustrates a lubricating composition different from Example 1 in the absence of hydroxylated linear polydimethylsiloxane oil. The composition of this emulsion is given in the following Table 5:

TABLE 2 lubricating composition 5

| Nature of the constituent | Identification | Percentage by weight in the emulsion |
|---|---|---|
| Phenylated siloxane oil M-($D^{Ph/Me}$)$_{20}$-(D)$_{80}$-M with a dynamic viscosity equal to $10^{-1}$ Pa · s to 25° C.[1] | Constituent (a'') | 39.92 |
| MDT-OH resin[2] | Constituent (b) | 5.71 |
| Methyltriethoxysilane | Constituent (c) | 0.38 |
| Dioctyltin dilaurate emulsion[3] | Constituent (d) | 0.24 |
| Polyethoxylated isotridecyl alcohol[4] | Constituent (e) | 2.71 |
| $NH_2$—($CH_3$)$_3$—Si(OH)$_3$[5] | Constituent (g) | 2.42 |
| Antifoaming agent | | 0.20 |
| Antioxidant | | 0.05 |
| Bactericide | | 0.02 |
| Thickener (xanthan gum) | | 0.11 |
| Wetting agent | | 0.30 |
| Distilled water | | 47.94 |
| | | 100 |

Legend [1] to [5]: cf. bottom of Table 1.

The process used to prepare the lubricating composition 5 is identical to the two-stage process described for Example 1.

The emulsion obtained is characterized by a mean particle size of 0.405 μm and a dry matter content (60 min, 120° C.) of 48.9% by weight.

COMPARATIVE EXAMPLE 6

TABLE 3

| Composition according to FR-A-2 494 294 | Parts by weight |
|---|---|
| Polydimethylsiloxane with terminal hydroxyl groups | 40.4 |
| Methylhydrogensiloxane (at 30%) | 175.0 |
| Zinc acetate/stearate (at 20%) | 43.7 |
| Antifoaming agent | 1.3 |
| Water | 610.8 |

Results

The properties of the compositions of Examples 1 to 6 were measured by evaluating the coefficients of friction and the durability.

A low coefficient of friction reflects good sliding properties.

The tests for measuring the coefficients of friction and the durability were adapted to the application of the lubricating composition to an inflatable rubber bladder.

Sliding Test

The objective of this test is to assess the sliding powder of a lubricating composition placed at the interface between the inflatable bladder and the inner surface of the tread of a pneumatic tire.

This test is carried out by causing a metal block of defined weight, to which is attached a film of pneumatic tread (50×75 mm), to slide over a surface of rubber, whose composition is that of the inflatable bladder.

The surface of the inflatable bladder is treated beforehand with the lubricating composition according to a procedure similar to that used in production, with crosslinking by heating to 165° C.

The coefficient of friction is measured with the aid of a tensiometer (at the speed of 50 mm/min.). Ten successive runs are made on the same inflatable bladder sample by changing each time the pneumatic tread sample.

The lower the values of the coefficient of friction, the better the sliding properties of the lubricating composition.

Ten runs give information on the exhaustion of the lubricating composition during successive moldings.

This sliding test is perfectly representative of the performance achieved on the industrial tool, it is a first criterion for selection.

Durability Test

The durability of a lubricating composition corresponds to the number of pneumatic tires made without degradation of the surface of the inflatable bladder. A film of inflatable bladder, treated beforehand with the lubricating composition to be evaluated, is pressed into contact with an uncured pneumatic tread film, in a series of pressure and temperature cycles simulating the steps in the manufacture of a pneumatic tire on an industrial tool.

The pneumatic tread film is replaced at each molding. The test is complete when the two surfaces in contact remain bonded. The lubricating composition at the surface of the film of the inflatable bladder is exhausted and no longer plays the role of lubricating interface.

The following Table 4 presents the coefficients of friction obtained at each run for each of the compositions of Examples 1 to 4, and those of the Comparative Examples 5 and 6.

TABLE 4

|  |  | Ex. 1 | Ex. 2 | Ex. 3 | Ex. 4 | Comp. Ex. 5 | Comp. Ex. 6 |
|---|---|---|---|---|---|---|---|
| coefficient of friction | 1st run | 0.03 | 0.18 | 0.46 | 0.04 | 0.07 | 0.11 |
|  | 2nd run | 0.06 | 0.23 | 0.48 | 0.06 | 0.11 | 0.16 |
|  | 3rd run | 0.08 | 0.24 | 0.51 | 0.07 | 0.17 | 0.21 |
|  | 4th run | 0.09 | 0.23 | 0.51 | 0.09 | 0.21 | 0.27 |
|  | 5th run | 0.10 | 0.26 | 0.52 | 0.11 | 0.23 | 0.38 |
|  | 6th run | 0.12 | 0.25 | 0.51 | 0.13 | 0.25 | 0.52 |
|  | 7th run | 0.13 | 0.28 | 0.53 | 0.16 | 0.28 | 0.62 |
|  | 8th run | 0.13 | 0.31 | 0.54 | 0.18 | 0.29 | 0.71 |
|  | 9th run | 0.14 | 0.30 | 0.57 | 0.29 | 0.34 | 0.77 |
|  | 10th run | 0.15 | 0.32 | 0.57 | 0.41 | 0.45 | 0.83 |

Table 5 presents the durability of the compositions of Examples 1 to 4 of the invention, and that of the comparative examples.

TABLE 5

| Example | Durability |
|---|---|
| Example 1 | >20 |
| Example 2 | >20 |
| Example 3 | >20 |
| Example 4 | 10 |
| Comparative Example 5 | 10 |
| Comparative Example 6 | 8 |

Conclusion:

The compositions of Examples 1 and 2 offer the best compromise between sliding performance and durability. The compositions of Examples 3 and 4 correspond to the maximum values of the (a)/(a') ratio where one of the criteria, sliding performance or durability, is not optimum.

The performance of the compositions of the comparative examples are in regression in relation to the compositions according to the invention.

Finally, the compositions according to the invention (Examples 1 to 4) offer a durability which is at least double compared with the compositions according to WO-A-01 40417. The combination of the oils (a) and (a') in the ratios according to the invention makes it possible to obtain sliding properties combined with durability with a marked improvement compared to the prior art.

EXAMPLE 7

This example illustrates a bonding primer.

Example 1 was repeated by choosing an (a)/(a') ratio equal to 0.25. As for the other examples, after crosslinking on the surface of rubber, the sliding test was applied. After 2 runs, the coefficient of friction was 1.12.

It should be clearly understood that the invention defined by the accompanying claims is not limited to the particular embodiments indicated in the description above, but encompasses the variants which do not depart from the scope or the spirit of the present invention.

What is claimed is:

1. A composition comprising:
   (a) at least one nonreactive linear polyorganosiloxane oil having lubricating properties, having a dynamic viscosity of the order of $5 \times 10^{-2}$ to $30 \times 10^2$ Pa·s at 25° C. and consisting of a linear polyorganosiloxane:
   consisting along each chain:
   of units of formula $R^2R^3SiO_{2/2}$, combined with units of formula $(R^2)_2SiO_{2/2}$, or
   of units of formula $(R^3)_2SiO_{2/2}$, combined with units of formula $(R^2)_2SiO_{2/2}$,
   and blocked at each chain end with a unit of formula $(R^2)_3SiO_{1/2}$;
   where the radicals $R^2$ and $R^3$ have the following definitions:
   the radicals $R^2$, which are identical to or different from each other, are selected from the group consisting of methyl, ethyl, propyl and isopropyl radicals,
   the radicals $R^3$, which are identical to or different from each other, are selected from the group consisting of phenyl, tolyl and benzyl radicals; and
   where at least 1%, in numerical terms, of the substituents $R^2$ and $R^3$ are phenyl, tolyl and/or benzyl radicals;
   (a') at least one reactive linear polyorganosiloxane oil having at least two OH groups per molecule and having a dynamic viscosity ranging from $5 \times 10^{-2}$ to 200,000 Pa·s at 25° C.;
   (b) at least one polyorganosiloxane resin carrying condensable hydroxyl substituents and having at least two different siloxyl units selected from those of the formula $(R^1)_3SiO_{1/2}(M)$; $(R^1)_2SiO_{2/2}(D)$; $R^1SiO_{3/2}(T)$ and $SiO_{4/2}(Q)$, at least one of said units being a T or Q unit, in which formulae $R^1$ represents a monovalent organic substituent, the average number per molecule of organic radicals $R^1$ for a silicon atom being between 1 and 2;
   (c) at least one crosslinking agent which is soluble in the silicone phase comprising at least two functional groups capable of reacting with the polyorganosiloxane resin (b);
   (d) at least one condensation catalyst capable of catalyzing the reaction of the constituent (b) with the constituent (c);
   (e) at least one surfactant; and
   (f) water,
   the quantities of surfactant(s) and of water being sufficient for producing an oil-in-water emulsion,
   the constituent (a)/constituent (a') weight ratio being within the range from 2 to 5, and the constituents (a), (a'), (b) and (c) being mixed with each other before emulsification,
   said composition being in the form of an oil-in-water emulsion which does not emit hydrogen and said composition having a lower coefficient of friction and increased durability relative to a composition having an a/a' ratio outside the claimed range.

2. The composition according to claim 1, wherein the dynamic viscosity specified in (a') ranges from $5 \times 10^{-2}$ to 150,000 Pa·s at 25° C.

3. The composition according to claim 1, wherein the dynamic viscosity specified in (a') ranges from $5 \times 10^{-2}$ to $30 \times 10^2$ Pa·s at 25° C.

4. The composition according to claim 1, wherein the resin (b) has a content by weight of hydroxyl substituents of between 0.1 and 10% by weight.

5. The composition according to claim 1, wherein the resin (b) has a content by weight of hydroxyl substituents of between 0.2 and 5% by weight.

6. The composition according to claim 1, wherein the oil (a) has per molecule at least 2% in numerical terms of phenyl, tolyl and benzyl radicals.

7. The composition according to claim 1, wherein the oil (a) has per molecule from 5 to 50% in numerical terms of phenyl, tolyl and benzyl radicals.

8. The composition according to claim 1, wherein the oil (a) has per molecule from 8 to 35% in numerical terms of phenyl, tolyl and benzyl radicals.

9. The composition according to claim 1, said composition comprising:

from 55 to 98.85 parts by weight of the sum of the constituents (a)+(a');

from 1 to 30 parts by weight of the constituent (b), from 0.1 to 10 parts by weight of the constituent (c), from 0.05 to 5 parts by weight of the constituent (d), per 100 parts by weight of the sum of the constituents (a)+(a')+(b)+(c)+(d).

10. The composition according to claim 1, wherein from 5 to 50%, in numerical terms, of the substituents $R^2$, $R^3$ and $R^4$ are aromatic radicals $R^3$.

11. The composition according to claim 1, wherein from 8 to 35%, in numerical terms, of the substituents $R^2$, $R^3$ and $R^4$ are aromatic radicals $R^3$.

12. The composition according to claim 1, wherein the oil (a) comprises a linear polyorganosiloxane having, per molecule, an aromatic substituents $R^3$/Si ratio (in numerical terms) at least equal to 0.04.

13. The composition according to claim 12, wherein the aromatic substituents $R^3$/Si ratio (in numerical terms) ranges from 0.09 to 1.

14. The composition according to claim 13, wherein the aromatic substituents $R^3$/Si ratio (in numerical terms) ranges from 0.16 to 0.7.

15. The composition according to claim 1, wherein the oil (a') is a linear polyorganosiloxane oil carrying organic substituents selected from the group consisting of:

linear and branched alkyl radicals; linear and branched alkenyl radicals;

cycloalkyl and cycloalkenyl radicals; and cycloalkylalkylene and cycloalkenylalkylene radicals; said radicals being optionally substituted with —OH and/or amino and/or halogen and/or cyano groups.

16. The composition according to claim 15, wherein the oil (a') has the formula

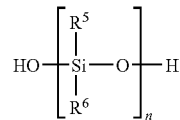

in which n is an integer greater than or equal to 10, $R^5$ and $R^6$, which are identical or different, represent: $(C_1$-$C_6)$alkyl; $(C_3$-$C_8)$cycloalkyl; $(C_2$-$C_8)$alkenyl; or $(C_5$-$C_8)$cycloalkenyl; each of said radicals being optionally substituted with a halogen atom or a cyano residue.

17. The composition according to claim 16, wherein $R^5$ and $R^6$ are selected independently from the group consisting of methyl, ethyl, propyl, isopropyl, cyclohexyl, vinyl and 3,3,3-trifluoropropyl.

18. The composition according to claim 17, wherein 80% in numerical terms of said radicals are methyl radicals.

19. The composition according to claim 16, wherein the oil (a') is an α,ω-dihydroxypolydimethylsiloxane.

20. The composition according to claim 1, wherein the oil (a') is a linear polyorganosiloxane oil carrying organic substituents selected from the group consisting of:

linear and branched alkyl radicals; linear and branched alkenyl radicals; cycloalkyl and cycloalkenyl radicals; and cycloalkylalkylene and cycloalkenylalkylene radicals; said radicals being optionally substituted with —OH and/or amino and/or halogen and/or cyano groups.

21. The composition according to claim 20, wherein the oil (a') has the formula

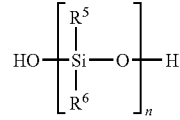

in which n is an integer greater than or equal to 10, $R^5$ and $R^6$, which are identical or different, represent: $(C_1$-$C_6)$alkyl; $(C_3$-$C_8)$cycloalkyl; $(C_2$-$C_8)$alkenyl; or $(C_5$-$C_8)$cycloalkenyl; each of said radicals being optionally substituted with a halogen atom or a cyano residue.

22. The composition according to claim 21, wherein $R^5$ and $R^6$ are selected independently from the group consisting of methyl, ethyl, propyl, isopropyl, cyclohexyl, vinyl and 3,3,3-trifluoropropyl.

23. The composition according to claim 22, wherein 80% in numerical terms of said radicals are methyl radicals.

24. The composition according to claim 21, wherein the oil (a') is an α,ω-dihydroxypolydimethylsiloxane.

25. The composition according to claim 1, wherein the oil (a') has the formula

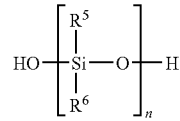

in which n is an integer greater than or equal to 10, $R^5$ and $R^6$, which are identical or different, represent: $(C_1\text{-}C_6)$alkyl; $(C_3\text{-}C_8)$cycloalkyl; $(C_2\text{-}C_8)$alkenyl; or $(C_5\text{-}C_8)$cycloalkenyl; each of said radicals being optionally substituted with a halogen atom or a cyano residue.

26. The composition according to claim 25, wherein $R^5$ and $R^6$ are selected independently from the group consisting of methyl, ethyl, propyl, isopropyl, cyclohexyl, vinyl and 3,3,3-trifluoropropyl.

27. The composition according to claim 26, wherein 80% in numerical terms of said radicals are methyl radicals.

28. The composition according to claim 25, wherein the oil (a') is an α,ω-dihydroxypolydimethylsiloxane.

29. The composition according to claim 1, wherein the oil (a) and/or the oil (a') has a dynamic viscosity at 25° C. of between $5\times10^{-2}$ and 30 Pa·s.

30. The composition according to claim 29, wherein the oil (a) has a dynamic viscosity at 25° C. of between $5\times10^{-2}$ and 5 Pa·s and the oil (a') has a dynamic viscosity at 25° C. of between 0.1 and 5 Pa·s.

31. The composition according claim 1, wherein the resin (b) is a hydroxylated DT or MDT resin comprising at least 20% by weight of T units and having a hydroxyl group content by weight ranging from 0.1 to 10%.

32. The composition according to claim 31, wherein the hydroxyl group content by weight of said resin ranges from 0.2 to 5%.

33. The composition according to claim 31, wherein the resin (b) has a dynamic viscosity at 25° C. of between 0.2 and 200 Pa·s.

34. The composition according to claim 33, wherein the resin (b) has a dynamic viscosity at 25° C. of between 0.5 and 50 Pa·s.

35. The composition according to claim 34, wherein the resin (b) has a dynamic viscosity at 25° C. of between 0.8 and 5 Pa·s.

36. The composition according to claim 1, wherein the resin (b) has a dynamic viscosity at 25° C. of between 0.2 and 200 Pa·s.

37. The composition according to claim 36, wherein the resin (b) has a dynamic viscosity at 25° C. of between 0.5 and 50 Pa·s.

38. The composition according to claim 37, wherein the resin (b) has a dynamic viscosity at 25° C. of between 0.8 and 5 Pa·s.

39. The composition according to claim 1, wherein the constituent (c) is a crosslinking agent of the formula:

in which:
a is 0, 1 or 2;
Y is a monovalent organic group; and
the groups Zi, which are identical or different, are selected from the group consisting of: —$OX_a$,

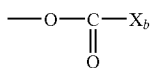

and —O—N=$CX_1X_2$, in which $X_a$, $X_b$, $X_1$ and $X_2$ are independently linear or branched $C_1\text{-}C_{10}$ alkyl radicals; $X_1$ and $X_2$ may additionally represent hydrogen; and $X_a$ is a radical which is optionally substituted with $(C_1\text{-}C_3)$alkoxy.

40. The composition according to claim 39, wherein the constituent (c) is an alkyltrialkoxysilane of formula $YSiZ_3$ in which Y is alkyl, and Z is alkoxy.

41. The composition according to claim 39, wherein the constituent (c) is selected from the group consisting of organotrialkoxysilanes, organotriacyloxysilanes, organotrioximosilanes and tetraalkyl silicates.

42. The composition according to claim 1, further comprising (g) from 0.5 to 15 parts by weight, per hundred parts by weight of the sum of the constituents (a)+(a')+(b)+(c)+(d)+(g), of a water-soluble crosslinking agent which is a silane carrying at least one organic group with a functional group $F_r$, $F_r$ being selected from the group consisting of optionally substituted amino functional groups, epoxy functional groups, optionally substituted acroyl ($CH_2$=CH—CO) functional groups, optionally substituted methacroyl ($CH_2$=C($CH_3$)—CO—) functional groups, optionally substituted ureido ($NH_2$—CO—NH—) functional groups, optionally substituted thiol functional groups and a halogen atom.

43. The composition according to claim 42, wherein the constituent (g) has the formula $R_2R_rN$—$R_a$—$Si(OH)_3$ in which $R_a$ represents alkylene and $R_1$ and $R_2$ represent a hydrogen atom or an alkyl group.

44. The composition according to claim 1, further comprising a film-forming polymer.

45. The composition according to claim 44, wherein the film-forming polymer is a styrene-acrylic polymer.

46. The composition according to claim 1, comprising from 40 to 95% by weight of water.

47. The composition according to claim 1, comprising from 0.5 to 10% by weight of surfactant.

48. The composition according to claim 1, wherein the constituent (a)/constituent (a') weight ratio is in the range from 3 to 5.

49. An article coated with a composition according to claim 1.

50. An article obtained by heating an article according to claim 49.

51. An inflatable rubber bladder coated on its outer surface with a composition according to claim 1, suitable for forming and curing pneumatic or semi-pneumatic tires.

52. An inflatable rubber bladder obtained by heating a bladder according to claim 51 to a temperature of 80 to 150° C.

53. A raw pneumatic or semipneumatic tire having components which will constitute its outer tread for coming into contact with the ground, coated on its inner surface with a composition according to claim 1.

54. A method for the lubrication of an article comprising applying thereto a composition according to claim 1.

55. A method for lubricating an inflatable curing bladder comprising applying a composition according to claim 1 to said inflatable bladder during the forming and curing of pneumatic or semipneumatic tires.

* * * * *